(12) United States Patent
Chen et al.

(10) Patent No.: US 11,998,923 B2
(45) Date of Patent: Jun. 4, 2024

(54) LITHIUM CONTAINING NANO POWDERS, MECHANICAL ALLOYS, OR COMBINATIONS THEREOF; METHODS, AND SYSTEMS FOR MANUFACTURING THE SAME

(71) Applicant: ABM Nano LLC, Missouri City, TX (US)

(72) Inventors: Zhuo Chen, Ontario (CA); Shizhu Chen, Ontario (CA); Hui Li, Sugarland, TX (US); Pufang Xiao, Ontario (CA)

(73) Assignee: ABM Nano LLC, Missouri City, TX (US)

( * ) Notice: Subject to any disclaimer, the term of this patent is extended or adjusted under 35 U.S.C. 154(b) by 0 days.

(21) Appl. No.: 17/664,044

(22) Filed: May 18, 2022

(65) Prior Publication Data

US 2022/0371023 A1   Nov. 24, 2022

Related U.S. Application Data

(60) Provisional application No. 63/190,732, filed on May 19, 2021.

(51) Int. Cl.
  *B02C 17/18* (2006.01)
  *H01M 4/485* (2010.01)

(52) U.S. Cl.
  CPC .......... *B02C 17/1815* (2013.01); *B02C 17/18* (2013.01); *H01M 4/485* (2013.01)

(58) Field of Classification Search
  CPC ...... B02C 17/1815; B02C 17/18; B02C 17/14
  See application file for complete search history.

(56) References Cited

U.S. PATENT DOCUMENTS

| | | | |
|---|---|---|---|
| 6,334,583 B1 | 1/2002 | Li | |
| 9,034,525 B2 | 5/2015 | Babic et al. | |
| 9,093,717 B2 | 7/2015 | Sakamoto et al. | |
| 2005/0211808 A1 | 9/2005 | Geiger et al. | |
| 2010/0173198 A1 | 7/2010 | Zhamu et al. | |
| 2015/0171463 A1 | 6/2015 | Liang et al. | |
| 2021/0167390 A1 * | 6/2021 | Treger | H01M 4/485 |
| 2022/0025502 A1 | 1/2022 | Durham et al. | |

FOREIGN PATENT DOCUMENTS

| | | | |
|---|---|---|---|
| CN | 111732433 A | 10/2020 | |
| CN | 112430090 A | 11/2020 | |
| WO | WO-2020023017 A1 * | 1/2020 | ............. B02C 17/20 |

\* cited by examiner

*Primary Examiner* — Faye Francis
(74) *Attorney, Agent, or Firm* — Schneer IP Law

(57) ABSTRACT

One general aspect of the present disclosure is directed to a method of manufacturing a lithium containing nano powder. An additional general aspect of the present disclosure relates to a system for manufacturing the lithium containing nano powder. A further general aspect of the present disclosure pertains to the lithium containing nano powder. A further general aspect of the present disclosure relates to converting a plurality of metals, a plurality of metal oxides, or a combination thereof into a mechanical alloy using the manufacturing method and system of the present disclosure. The mechanical alloy may be a powder, e.g., a nano powder, and may or may not include the lithium containing nano powder.

20 Claims, 3 Drawing Sheets

Figure 1:
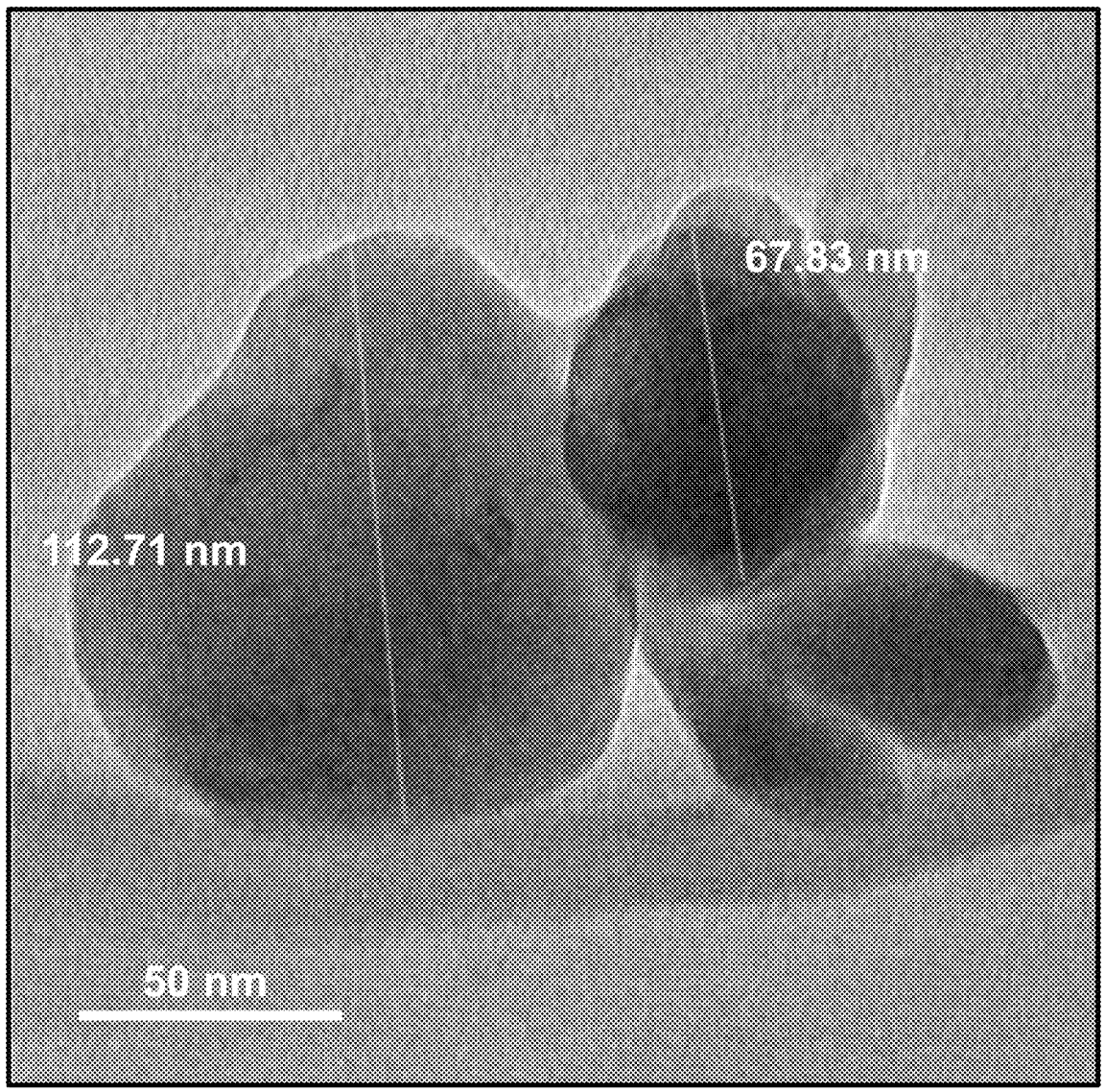

LITHIUM CONTAINING NANO POWDERS, MECHANICAL ALLOYS, OR COMBINATIONS THEREOF; METHODS, AND SYSTEMS FOR MANUFACTURING THE SAME

PRIORITY

The present application claims priority to U.S. Provisional Application No. 63/190,732 filed May 19, 2021, which is incorporated herein by reference in its entirety for all purposes.

FIELD

The present disclosure relates to lithium containing nano powders, mechanical alloys, or combinations thereof. The present disclosure further relates to methods and systems used to manufacture lithium containing nano powders, mechanical alloys, or combinations thereof.

BACKGROUND

Lithium containing materials and other types of mechanical alloys are used in several industries, including the emerging field of solid-state batteries, which uses lithium containing materials as materials for anodes, cathodes, and solid electrolytes. Lithium containing materials for solid electrolytes may be obtained as microscopic powders. These microscopic lithium containing powders may be sintered to form the anodes, cathodes, or solid electrolytes. However, sintered solid electrolytes made from currently available lithium containing microscopic powders can be prone to dendrite formation during battery operation.

To mitigate the likelihood of dendrite formation, ideally one would further reduce the particle size of the lithium containing materials beyond the microscopic scale. However, this comes with several technical obstacles. For one, as lithium containing materials become smaller during a size reduction process, the reduced size increases the likelihood of the lithium containing materials to accumulate on surfaces of a size reduction device. Additionally, size reduction processes (such as milling processes) can generate a substantial amount of heat. This can cause a temperature of the process to approach the melting point of lithium, resulting in the lithium containing material partially or fully liquifying.

Some have attempted to reduce the particle size of the lithium containing material by introducing liquids, such as liquid solvents into the size reduction process. However, this can introduce impurities into the lithium containing material, which can be expensive to remove.

Accordingly, there is a need for improved lithium containing nano powders and for improved methods and systems for manufacturing the same.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

One general aspect of the present disclosure is directed to a method of manufacturing a lithium containing nano powder. In some specific, non-limiting examples, the method may include: milling the lithium containing material with the milling device while the milling device is in a first position; turning the milling device, so that the milling device is in a second position; agitating the lithium containing material; cooling the lithium containing material; returning the milling device to the first position; and repeating the milling, turning, agitating, cooling, and returning steps until the lithium containing material is converted into a lithium containing nano powder.

A further general aspect of the present disclosure relates to a method of manufacturing a mechanical alloy from a plurality of metals, a plurality of metal oxides, or a combination thereof using the above method steps.

An additional general aspect of the present disclosure relates to a system for manufacturing the lithium containing nano powder. In some specific, non-limiting examples, the system may include: a milling device; an agitating device configured to agitate a lithium containing material inside the milling device; and a cooling device configured to cool the lithium containing material inside the milling device.

A further general aspect of the present disclosure pertains to the lithium containing nano powder. In some specific, non-limiting examples, the lithium containing nano powder may include lithium and at least one additional element chosen from: at least one transition metal, at least one rare earth metal, at least one non-metal element, or any combination thereof.

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

DRAWINGS

Figure 2:
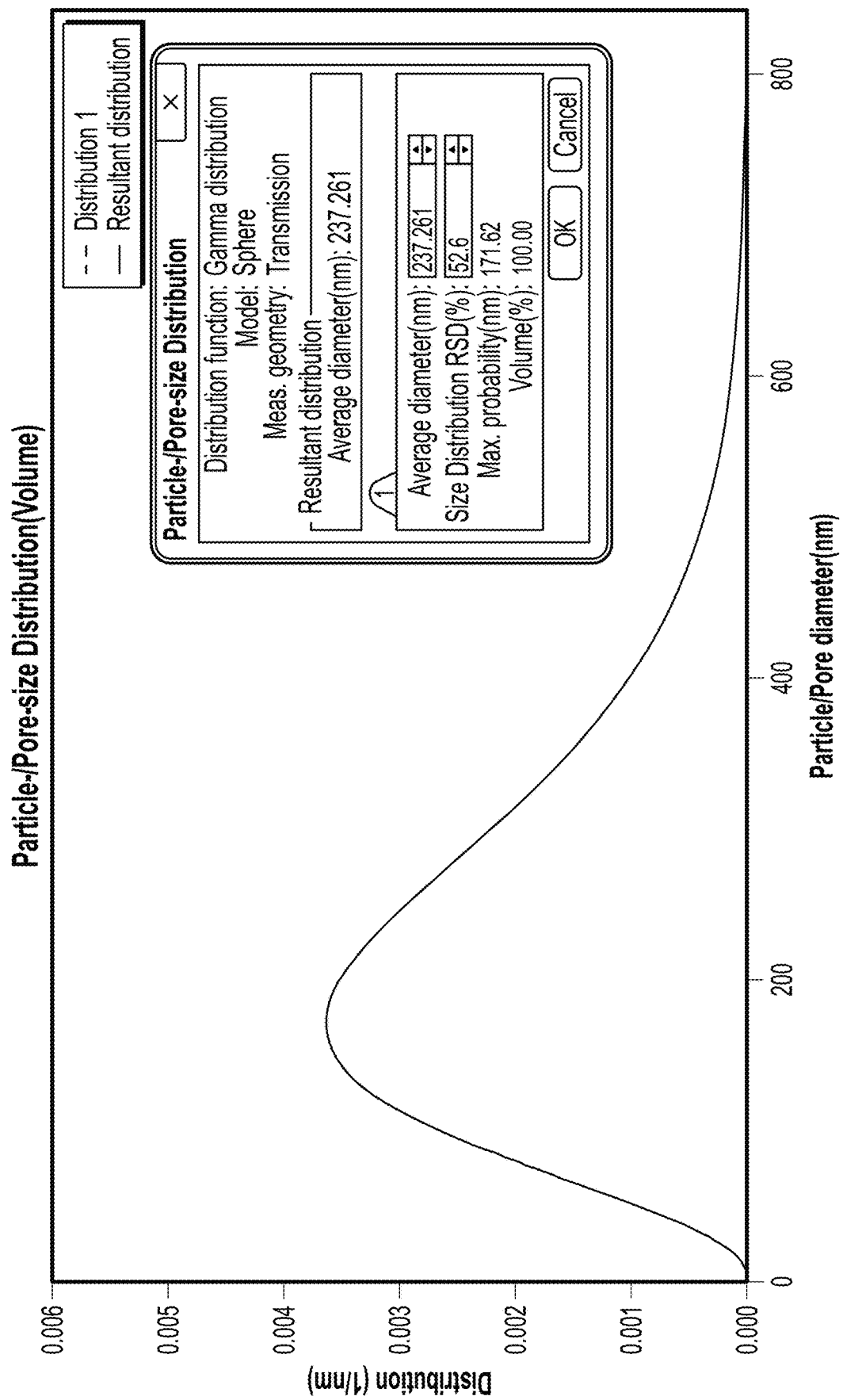
Figure 3:
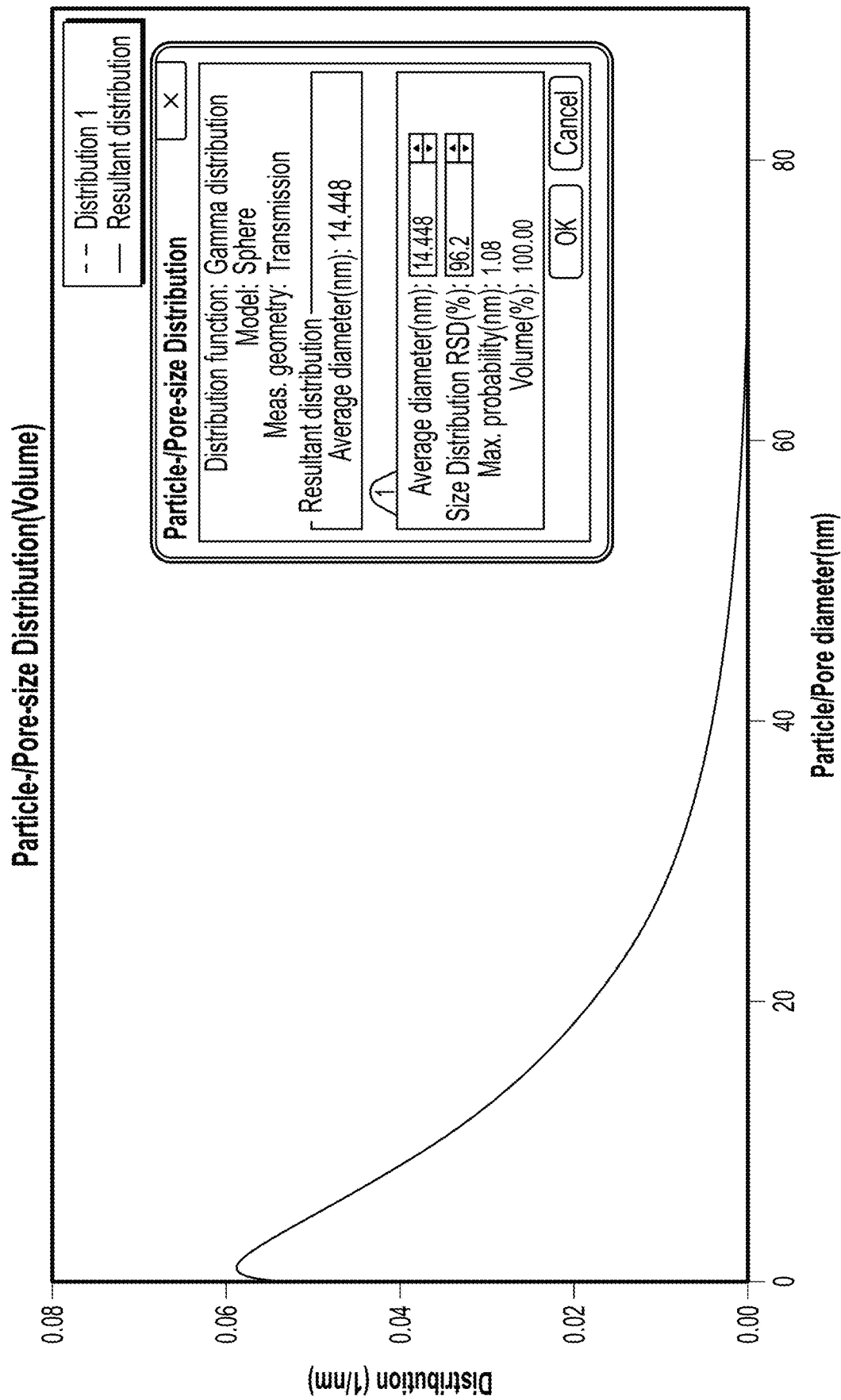

FIGS. 1 to 3 depict non-limiting examples of particle sizes of lithium containing nano powder according to some aspects of the present disclosure.

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

One general aspect of the present disclosure relates to a method of manufacturing lithium containing nano powder from a lithium containing material. As used herein, a "lithium containing material" is a material comprising lithium. As used herein, a "nano powder" is a powder having an average particle size from 1 nm to 1000 nm. As used herein, "average particle size" may refer to particle radius, particle diameter, particle length, particle width, particle depth, or any combination thereof. As used herein, "lithium containing nano powder" is a nano powder comprising lithium.

In some examples, the lithium containing material can include lithium and at least one additional element. In certain specific examples, the at least one additional element may be a plurality of additional elements. In some examples, the additional element or additional elements can be chosen from at least one transition metal, at least one rare earth metal, at least one non-metal element, or any combination thereof. In certain embodiments, the additional elements comprise can comprise at least one transition metal, at least one non-metal element, and at least one rare earth metal. In some implementations, the at least one transition metal can be zirconium, titanium, manganese, nickel, cobalt, aluminum, iron, copper, gold, silver, platinum, palladium, or any combination thereof. In certain instances, the rare earth metal can be lanthanum, yttrium, cerium, neodymium, or any combination thereof. In some examples, the at least one non-metal element can include oxygen, phosphorous, carbon, sulfur, carbon, silicon, or any combination thereof.

Some specific examples of suitable lithium containing materials include but are not limited to: lithium lanthanum zirconium oxide (LLZO), lithium titanate (LTO), carbon-coated LTO, lithium manganese oxide (LMO), lithium nickel cobalt aluminum oxide (NCA), lithium manganese nickel oxide (LMNO), lithium aluminum titanium phosphate (LATP)-coated LMNO, lithium lanthanum titanate, aluminum-doped lithium lanthanum zirconium oxide (Al-doped LLZO), lithium aluminum titanium phosphate (LATP), lithium cobalt oxide (LCO), lithium nickel manganese cobalt oxide (LNMC), lithium iron phosphate (LFP), lithium copper nitride ($Li_{2.6}Cu_{0.4}N$), lithium cobalt copper oxide ($Li_{2.6}Co_{0.2}Cuo.2O_2$), or any combination thereof.

In certain implementations, the lithium containing material is loaded into the milling device as a powder. The powder may be a microscopic powder. As used herein, a "microscopic powder" is a powder that has an average particle size of 1 micron or more. In some examples, the average particle size of the microscopic powder is not necessarily limited and can be, for example, 1 to 1000 microns, 10 to 1000 microns, 50 to 1000 microns, 100 to 1000 microns, 500 to 1000 microns, 1 to 500 microns, 1 to 100 microns, 1 to 50 microns, 1 to 10 microns, 50 to 500 microns, 10 to 100 microns, or any combination thereof. In some embodiments, the microscopic powder may comprise macroscopic particles. As used herein, "macroscopic particles" are particles having an average particle size of 1 millimeter or more.

In some embodiments, the lithium containing material that is subjected to milling comprises, consists, or consists essentially of microscopic LLZO powder. In some embodiments, the lithium containing material does not include any chemical elements other than lithium, lanthanum, zirconium, or oxygen.

In some examples, the lithium containing material may be synthesized within the milling device during operation. This can occur through the formation of a mechanical alloy within the milling device. Synthesizing the lithium containing material in the milling device, may in some implementations, be performed using a plurality of metals, a plurality of metal oxides, or a combination thereof. In one specific example, the lithium containing material is LLZO, which can be formed, as a mechanical alloy in the milling device using, e.g., lithium oxide, lanthanum oxide, and zirconium oxide. In one non-limiting implementation, the lithium oxide, lanthanum oxide, and zirconium oxide can be added to the milling device in a weight ratio of 3.5:1.5:2.

In some examples, a series of cations may be added to the milling device as dopants to stabilize the lithium containing material and improve ionic conductivity. In some embodiments, the series of cations may include, but is not limited to, $Fe^{3+}$, $Al^{3+}$, $Ga^{3+}$, $Nb^{4+}$, $Ta^{5+}$, $Te^{6+}$, or any combination thereof. Certain examples of the method may include adding excess lithium to the lithium containing material during the method.

In some examples, the method may be used to synthesize a wide class of materials other than lithium containing materials. This may be accomplished by adding a plurality of metals, a plurality of metal oxides, or a combination thereof to the milling device, to form a mechanical alloy, as described above. This wide class of materials may include, but is not limited to, bismuth containing alloys, antimony containing alloys, transition metal carbides, iron containing alloys, nickel containing alloys, or any combination thereof. In certain aspects, the mechanical alloy can be a mechanical alloy powder. The mechanical alloy powder may further be a mechanical alloy nano powder. The mechanical alloy nano powder can have a range for average particle size that is the same as that of any embodiment of a lithium containing nano powder described herein.

The method may further include milling the lithium containing material with the milling device. The milling device may be any milling device known in the art. For example, the milling device can be a rod mill, an autogenic mill, a semi-autogenous grinding (SAG) mill, a pebble mill, or a vertical shaft impactor (VSI) mill. In a specific embodiment, the milling device may include a milling chamber and a plurality of milling media. In certain embodiments of the present disclosure, the milling chamber may be a milling pot. The milling pot may be a ceramic milling pot. The ceramic milling pot can comprise some or all of the same elements as the lithium containing material. This may reduce the likelihood of impurities being introduced during the method. The ceramic milling pot can comprise various materials, such as but not limited to, zirconium oxide, aluminum oxide, LLZO, or any combination thereof. The milling pot can also be a polymer milling pot. The polymer milling pot can comprise, for example, polyurethane, or epoxy. In some implementations, the milling device is a ball mill, and the milling media are milling balls. In some examples, the milling balls may have at least one element in common with the lithium containing material. This also may reduce the likelihood of impurities being introduced during the method.

In some examples, milling the lithium containing material may include rotating the milling device about an axis of the milling device. Rotating the milling device about an axis of the milling device can, in some examples, cause the plurality of milling media to repeatedly contact the lithium containing material thereby reducing the size of the lithium containing material. In examples where the milling device is a ball mill, the plurality of milling balls can repeatedly contact the lithium containing material thereby reducing the size of the lithium containing material.

In some examples, the milling is performed by rotating the milling device at a rotational speed. In some embodiments, the rotational speed of the milling device can range from: 100 rpm to 3000 rpm, 500 rpm to 3000 rpm, 1000 rpm to 3000 rpm, 2000 rpm to 3000 rpm, 100 rpm to 2000 rpm, 100 rpm to 1000 rpm, 100 rpm to 500 rpm, 500 rpm to 2000 rpm, 500 rpm to 1000 rpm, 1000 rpm to 2000 rpm, or any combination thereof.

In some embodiments, milling the lithium containing material can occur while the milling device is in a first position. In some implementations, the first position is a vertical position. However, the first position may be a horizontal position in certain embodiments. Moreover, the vertical position can be inverted (i.e., "upside down") or upright.

In some embodiments, the method may further include turning the milling device so that the milling device is in a second position. In some implementations, the second position is a horizontal position. However, the second position may be a vertical position in certain embodiments. Turning the milling device may, in certain embodiments, include turning the milling device 90° (e.g., by turning the milling device on its side). The milling device can be turned clockwise or counterclockwise without limitation. The milling device can also be turned continuously or periodically.

In certain examples, the method can include agitating the milling device. The agitating can occur, such as for example, by knocking the milling device or shaking the milling device.

In some examples, agitating the lithium containing material inside the milling device may include striking the milling device with an agitating device. In certain implementations, the agitating device may comprise an impact rod. The impact rod may agitate the milling device by moving in multiple directions (e.g., upwardly and downwardly). The impact rod may also agitate the milling device by vibrating while in contact with the milling device. In some examples, the impact rod may vibrate and move in multiple directions simultaneously, thereby agitating the milling device. The agitating may occur while the milling device is in the second position, which can in some instances, be a horizontal position.

The location of the agitating device is not limited so long as the agitating device is within striking distance of the milling device. As used herein, "within striking distance" means that the agitating device is present at a sufficient distance from the milling device to agitate the milling device. For instance, the agitating device can be inside the milling device (at the top, bottom, or sides), outside of the milling device, or any combination thereof. In some embodiments, the agitating device can include multiple components (e.g., multiple impact rods). In certain aspects, one component (e.g., one impact rod) of the agitating device may be inside the milling device while another component (e.g., a second impact rod) of the agitating device may be outside of the milling device. In some examples, the first component and the second component may agitate the milling device sequentially. In some embodiments, the first component and the second component may agitate the milling device simultaneously.

Certain implementations of the method may comprise agitating the milling device by rotating the milling device about an axis of the milling device. Agitating the milling device by rotation may occur while the milling device is in the second position, which can in some instances, be a horizontal position. Agitating the milling device by rotation can also be performed simultaneously or sequentially with other forms of agitation, such as during the striking of the milling device with the impact rod.

Agitating the milling device by rotation may occur at a rotational speed that is less than the rotational speed during the milling step. For instance, the rotational speed during agitation can range from: 5 rpm to 500 rpm, 50 rpm to 500 rpm, 100 rpm to 500 rpm, 100 rpm to 500 rpm, 200 rpm to 500 rpm, 300 rpm to 500 rpm, 400 rpm to 500 rpm, 5 rpm to 400 rpm, 5 rpm to 300 rpm, 5 rpm to 200 rpm, 5 rpm to 100 rpm, 5 rpm to 50 rpm, 50 rpm to 400 rpm, 100 rpm to 300 rpm, 100 rpm to 200 rpm, 200 rpm to 300 rpm, or any combination thereof.

Some embodiments of the method may include cooling the lithium containing material inside the milling device. Cooling the lithium containing material inside the milling device can take place while the milling device is in the second position, which can in some instances, be a horizontal position. Cooling the lithium containing material inside the milling device can occur, in certain examples, by contacting the milling device with a cooling medium. The cooling medium can be any suitable cooling medium and can be a solid, a liquid, or a gas. In some specific examples, the cooling medium may include water. In further embodiments, the cooling medium may comprise at least one refrigerant.

Cooling the lithium containing material inside the milling device can, in certain embodiments, comprise directly contacting the milling device with the cooling medium. For instance, directly contacting the milling device with the cooling medium may include dispersing a cooling medium to an area surrounding the milling device using a nozzle. Dispersing the cooling medium to an area surrounding the milling device using a nozzle can cause the cooling medium to directly contact an outside of the milling device, thereby cooling the lithium containing material inside the milling device.

Cooling the lithium containing material inside the milling device can, in some instances, comprise indirectly contacting the milling device with the cooling medium. In certain example embodiments, indirectly contacting the milling device with a cooling medium may comprise running the cooling medium through a cooling jacket that surrounds the milling device.

The method, in certain embodiments, can comprise returning the milling device to the first position. Returning the milling device to the first position, may include turning the milling device in an opposite direction relative to the turning step. For instance, if the milling device is turned 90° clockwise during the turning step, the milling device may be turned 90° counterclockwise during the step of returning the milling device to the first position. Likewise, if the milling device is turned 90° counterclockwise during the turning step, the milling device may be turned 90° clockwise during the step of returning the milling device to the first position. As mentioned above, the first position may be a vertical position or a horizontal position.

In certain embodiments, some or all the method steps can be repeated until the lithium containing material is converted into a lithium containing nano powder. The method steps can be repeated once or multiple times. In some embodiments, the milling, turning, agitating, cooling, and returning steps may be repeated.

In some examples, some or all the method steps can be repeated until the lithium containing nano powder reaches a target average particle size. For instance, the target average particle size can be from: 1 nm to 500 nm, 5 nm to 500 nm, 10 nm to 500 nm, 25 nm to 500 nm, 50 nm to 500 nm, 75 nm to 500 nm, 100 nm to 500 nm, 1 nm to 100 nm, 1 nm to 75 nm, 1 nm to 50 nm, 1 nm to 25 nm, 1 nm to 10 nm, 1 nm to 5 nm, 5 nm to 100 nm, 10 nm to 75 nm, 25 nm to 50 nm, or any combination thereof.

In certain instances, during the method, a temperature inside of the milling device is maintained at a temperature that is less than the melting point of lithium, which is 180° C. In some embodiments, a temperature inside of the milling device is maintained at room temperature, which as defined herein is from 20° C. to 30° C. In some embodiments, during the method, a temperature inside of the milling device may be maintained at various temperature ranges, such as but not limited to: 20° C. to 180° C., 40° C. to 180° C., 60° C. to 180° C., 80° C. to 180° C., 100° C. to 180° C., 120° C. to 180° C., 140° C. to 180° C., 160° C. to 180° C., 20° C. to 160° C., 20° C. to 140° C., 20° C. to 120° C., 20° C. to 100° C., 20° C. to 80° C., 20° C. to 60° C., 20° C. to 40° C., 40° C. to 160° C., 60° C. to 140° C., 80° C. to 120° C., or any combination thereof.

In some embodiments, the method does not comprise contacting the lithium containing material with a liquid. In certain examples, the method does not comprise contacting the lithium containing material with a solvent. Some examples of solvents that may be excluded from some methods of present disclosure include organic solvents, such as but not limited to alcohols. In some embodiments, the milling device (e.g., the milling pot), can be sealed with a gas throughout the method. The gas may be an inert gas. The inert gas can, for example, be nitrogen or a noble gas such as xenon or argon.

In certain embodiments, the method results in an improved production yield of the lithium containing nano powder. In some embodiments, the improved production yield may be from: 98% to 100%, 99% to 100%, 99.5% to 100%, 99.95% to 100%, 99.995% to 100%, 99.9995% to 100%, or any combination thereof.

Some non-limiting aspects of the present disclosure pertain to a system for manufacturing the lithium containing nano powder. The system may, in certain examples, be used to perform the method described above. In some examples, the system may include the milling device described above. In certain implementations, the system may include the agitating device described above. The agitating device may be configured to agitate a lithium containing material inside the milling device. In some instances, the system may include the cooling device. The cooling device may be configured to cool the lithium containing material inside the milling device.

The aforementioned steps can be repeated until the lithium containing material 6 is converted into a lithium containing nano powder having a target average particle size.

Some aspects of the present disclosure may pertain to the lithium containing nano powder. In some specific, non-limiting examples, the lithium containing nano powder may comprise, consist of, or consist essentially of lithium and at least one additional element. In some specific, non-limiting examples, the lithium containing nano powder may comprise, consist of, or consist essentially of lithium and a plurality of additional elements. The additional element or elements may comprise, consist of, or consist essentially of at least one transition metal, at least one rare earth metal, at least one non-metal element, or any combination thereof. In some specific, non-limiting examples, the lithium containing nano powder may comprise, consist of, or consist essentially of LLZO nano powder.

In certain implementations, the lithium containing material may be the same or different as the examples of the lithium containing material described above. In some examples, the at least one transition metal, the at least one rare earth metal, the at least one non-metal element, or any combination thereof may be the same as those disclosed above. In some examples, the at least one transition metal, the at least one rare earth metal, the at least one non-metal element, or any combination thereof may be different from those disclosed above.

In some embodiments, the lithium containing nano powder may have a specific average particle size. In some implementations, the lithium containing nano powder can be approximated as being spherical using approximation methods known in the art. When the lithium containing nano powder is approximated as being spherical, the average particle size can be taken as a diameter of the lithium containing nano powder. Some examples of average particle sizes include: 1 nm to 500 nm, 5 nm to 500 nm, 10 nm to 500 nm, 25 nm to 500 nm, 50 nm to 500 nm, 75 nm to 500 nm, 100 nm to 500 nm, 1 nm to 100 nm, 1 nm to 75 nm, 1 nm to 50 nm, 1 nm to 25 nm, 1 nm to 10 nm, 1 nm to 5 nm, 5 nm to 100 nm, 10 nm to 75 nm, 25 nm to 50 nm, or any combination thereof.

Further examples of average particle sizes are shown in FIGS. 1 to 3. FIG. 1 depicts example particles of lithium containing nano powder captured using transmission electron microscopy (TEM). As shown, in FIG. 1, a first example particle has a diameter of 67.83 nm, while a second example particle has a diameter of 112.71 nm. FIGS. 2 and 3 depict particle distributions of certain lithium containing nano powder according to the present disclosure. As shown in FIG. 2, one example of a lithium containing nano powder can have an average particle size of 237 nm as indicated by the peak of the particle size distribution in FIG. 2. As shown in FIG. 3, one example of a lithium containing nano powder can have an average particle size of 14.4 nm as indicated by the peak of the particle size distribution in FIG. 3.

The lithium containing nano powder may, in some examples, have a specific particle density. For instance, the lithium containing nano powder may have a particle density of: 0.5 $g/cm^3$ to 1 $g/cm^3$, 0.6 $g/cm^3$ to 1 $g/cm^3$, 0.7 $g/cm^3$ to 1 $g/cm^3$, 0.8 $g/cm^3$ to 1 $g/cm^3$, 0.9 $g/cm^3$ to 1 $g/cm^3$, 0.5 $g/cm^3$ to 0.9 $g/cm^3$, 0.5 $g/cm^3$ to 0.8 $g/cm^3$, 0.5 $g/cm^3$ to 0.7 $g/cm^3$, 0.5 $g/cm^3$ to 0.6 $g/cm^3$, 0.6 $g/cm^3$ to 0.9 $g/cm^3$, 0.7 $g/cm^3$ to 0.8 $g/cm^3$, or any combination thereof. In some further examples, the lithium containing nano powder may have a particle density of: 0.8 $g/cm^3$ to 0.9 $g/cm^3$, 0.82 $g/cm^3$ to 0.9 $g/cm^3$, 0.84 $g/cm^3$ to 0.9 $g/cm^3$, 0.86 $g/cm^3$ to 0.9 $g/cm^3$, 0.88 $g/cm^3$ to 0.9 $g/cm^3$, 0.8 $g/cm^3$ to 0.88 $g/cm^3$, 0.8 $g/cm^3$ to 0.86 $g/cm^3$, 0.8 $g/cm^3$ to 0.84 $g/cm^3$, 0.8 $g/cm^3$ to 0.82 $g/cm^3$, 0.82 $g/cm^3$ to 0.88 $g/cm^3$, 0.84 $g/cm^3$ to 0.86 $g/cm^3$, or any combination thereof. In yet further examples, the lithium containing nano powder may have a particle density of: 0.1 $g/cm^3$ to 5 $g/cm^3$, 0.2 $g/cm^3$ to 5 $g/cm^3$, 0.5 $g/cm^3$ to 5 $g/cm^3$, 1 $g/cm^3$ to 5 $g/cm^3$, 2 $g/cm^3$ to 5 $g/cm^3$, 3 $g/cm^3$ to 5 $g/cm^3$, 4 $g/cm^3$ to 5 $g/cm^3$, 0.1 $g/cm^3$ to 4 $g/cm^3$, 0.1 $g/cm^3$ to 3 $g/cm^3$, 0.1 $g/cm^3$ to 2 $g/cm^3$, 0.1 $g/cm^3$ to 1 $g/cm^3$, 0.1 $g/cm^3$ to 1 $g/cm^3$, 0.1 $g/cm^3$ to 0.5 $g/cm^3$, 0.1 $g/cm^3$ to 0.2 $g/cm^3$, 0.2 $g/cm^3$ to 4 $g/cm^3$, 0.5 $g/cm^3$ to 3 $g/cm^3$, 1 $g/cm^3$ to 2 $g/cm^3$, or any combination thereof.

In some implementations, the lithium containing nano powder may exhibit a specific sintering temperature. As used herein, a sintering temperature is the temperature required to form a solid mass from the lithium containing nano powder by heat at ambient pressure without melting the lithium containing nano powder, Some specific examples of sintering temperatures include, but are not limited to: 500° C. to 1250° C., 600° C., to 1250° C., 700° C. to 1250° C., 800° C. to 1250° C., 900° C. to 1250° C., 1000° C. to 1250° C., 500° C. to 1000° C., 500° C. to 800° C., 500° C. to 700° C., 500° C. to 600° C., 600° C. to 1000° C., 700° C. to 800° C., or any combination thereof.

In certain examples, the lithium containing nano powder may exhibit a specific sintering time. As used herein, a sintering temperature is the temperature required to form a solid mass from the lithium containing nano powder, by heat, at ambient pressure, and a sintering temperature described herein without melting the lithium containing nano powder. Some specific examples of sintering times include, but are not limited to: 0.3 hours to 10 hours, 0.5 hours to 10 hours, 1 hour to 10 hours, 2 hours to 10 hours, 4 hours to 10 hours, 6 hours to 10 hours, 8 hours to 10 hours, 0.3 hours to 8 hours, 0.3 hours to 6 hours, 0.3 hours to 4 hours, 0.3 hours to 2 hours, 0.3 hours to 1 hour, 0.3 hours to 0.5 hours, 0.5 hours to 8 hours, 1 hour to 6 hours, 2 hours to 4 hours, or any combination thereof.

In some examples, the lithium containing nano powder has at most 2% of impurities by weight. In further examples, the lithium containing nano powder has at most 1% of impurities by weight. In yet further examples, the lithium containing nano powder has at most 0.5% of impurities by weight. In yet further examples, the lithium containing nano powder has at most 0.1% of impurities by weight. In additional examples, the lithium containing nano powder has at most 0.05% of impurities by weight. In additional examples, the lithium containing nano powder has at most 0.01% of impurities by weight. In further examples, the lithium containing nano powder has at most 0.001% of impurities by weight.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

All prior patents, publications, and test methods referenced herein are incorporated by reference in their entireties.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

As used herein, the term "consisting essentially of" limits the scope of a specific claim to the specified materials or steps and those that do not materially affect the basic and novel characteristic or characteristics of the specific claim. In some embodiments, a claim reciting "consisting essentially of" may allow for the addition of any unrecited component that does not materially affect at least one of the following: sintering temperature, sintering time, average particle size, or particle density. In some embodiments, a claim reciting "consisting essentially of" may allow for the addition of at least one additive, at least one filler, or any combination thereof.

The disclosure described herein may be practiced in the absence of any element or elements, limitation or limitations, which is not specifically disclosed herein. Thus, for example, in each instance herein, any of the terms "comprising," "consisting essentially of and "consisting of" may be replaced with either of the other two terms. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A method comprising:
   milling microscopic lithium lanthanum zirconium oxide (LLZO) powder with a milling device while the milling device is in a first position;
   turning the milling device, so that the milling device is in a second position;
   agitating the microscopic LLZO powder while the milling device is in the second position;
   cooling the microscopic LLZO powder while the milling device is in the second position;
   returning the milling device to the first position; and
   repeating the milling, turning, agitating, cooling, and returning steps until the microscopic LLZO powder is converted into LLZO nano powder.

2. The method of claim 1, where the milling device is a ball mill comprising:
   a milling chamber; and
   a plurality of milling balls.

3. The method of claim 1, where the microscopic LLZO powder has an average particle size of 1 to 1000 microns.

4. The method of claim 1, further comprising synthesizing the microscopic LLZO powder within the milling device using a plurality of metals, a plurality of metal oxides, or a combination thereof.

5. The method of claim 1, where milling the microscopic LLZO powder comprises rotating the milling device about an axis of the milling device at a rotational speed of 100 rpm to 3000 rpm.

6. The method of claim 1, where the first position is a vertical position.

7. The method of claim 1, where the second position is a horizontal position.

8. The method of claim 1, where turning the milling device to the second position comprises turning the milling device 90°.

9. The method of claim 1, where returning the milling device to the first position comprises turning the milling device 90° in an opposite direction.

10. The method of claim 1, where the LLZO nano powder has an average particle size of 1 nm to 500 nm.

11. The method of claim 1, where a temperature inside the milling device ranges from 20° C. to 180° C.

12. The method of claim 1, where agitating the microscopic LLZO powder inside the milling device comprises striking the milling device with an impact rod.

13. The method of claim 1, where agitating the microscopic LLZO powder comprises rotating the milling device about an axis of the milling device at a rotational speed of 5 rpm to 500 rpm.

14. The method of claim 1, where cooling the microscopic LLZO powder comprises directly contacting the milling device with a cooling medium by dispersing a cooling medium to an area surrounding the milling device using a nozzle.

15. The method of claim 1, where cooling the microscopic LLZO powder comprises indirectly contacting the milling device with a cooling medium by running the cooling medium through a cooling jacket that surrounds the milling device.

16. The method of claim 1, where the method does not comprise contacting the microscopic LLZO powder with a liquid.

17. The method of claim 1, where the method does not comprise contacting the microscopic LLZO powder with a solvent.

18. The method of claim 1, where the method results in a production yield, of the LLZO nano powder, of 98% to 100%.

19. The method of claim 1 where the LLZO nano powder has an average particle size of 1 nanometers to 500 nanometers.

20. The method of claim 1 where the LLZO powder has the lithium containing nano powder has a particle density of 0.1 g/cm$^3$ to 5 g/cm$^3$.

* * * * *